Oct. 6, 1942.    H. E. HRUSKA    2,298,012
TRANSMISSION OPERATING MEANS
Filed June 17, 1939    4 Sheets-Sheet 1
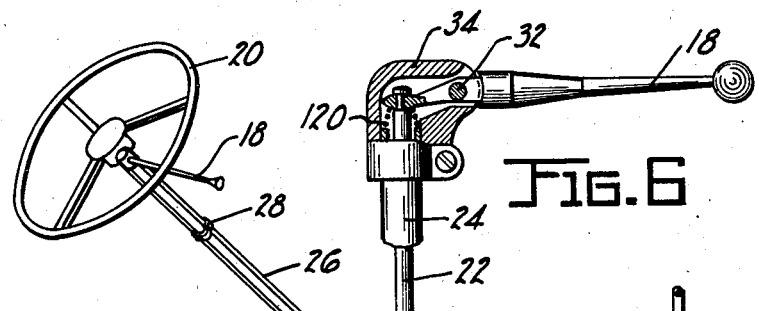
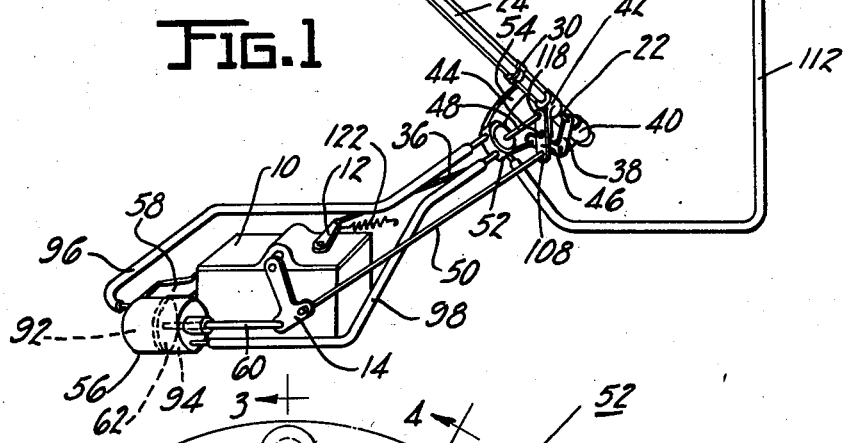
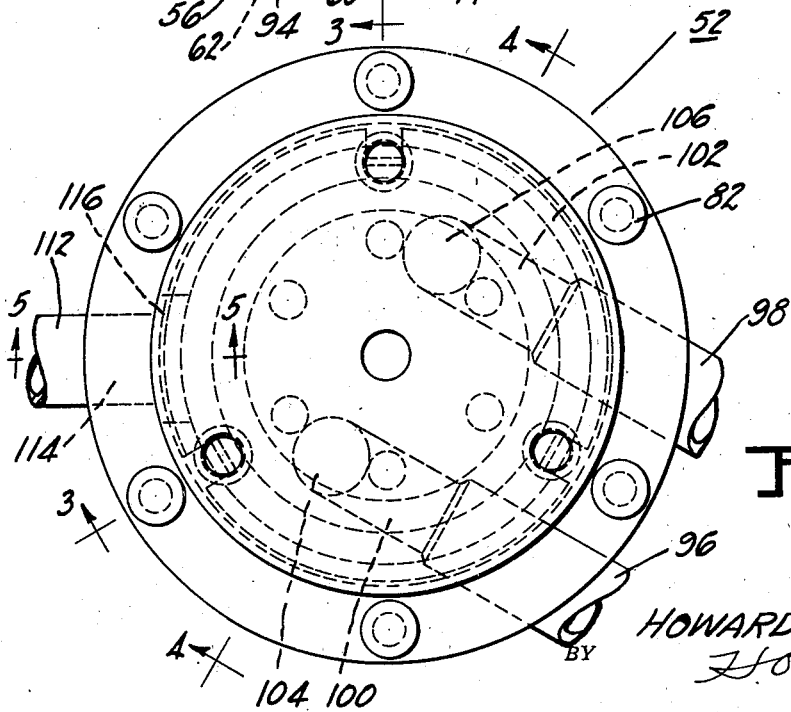
INVENTOR.
HOWARD E. HRUSKA
BY H. O. Clayton
ATTORNEY.

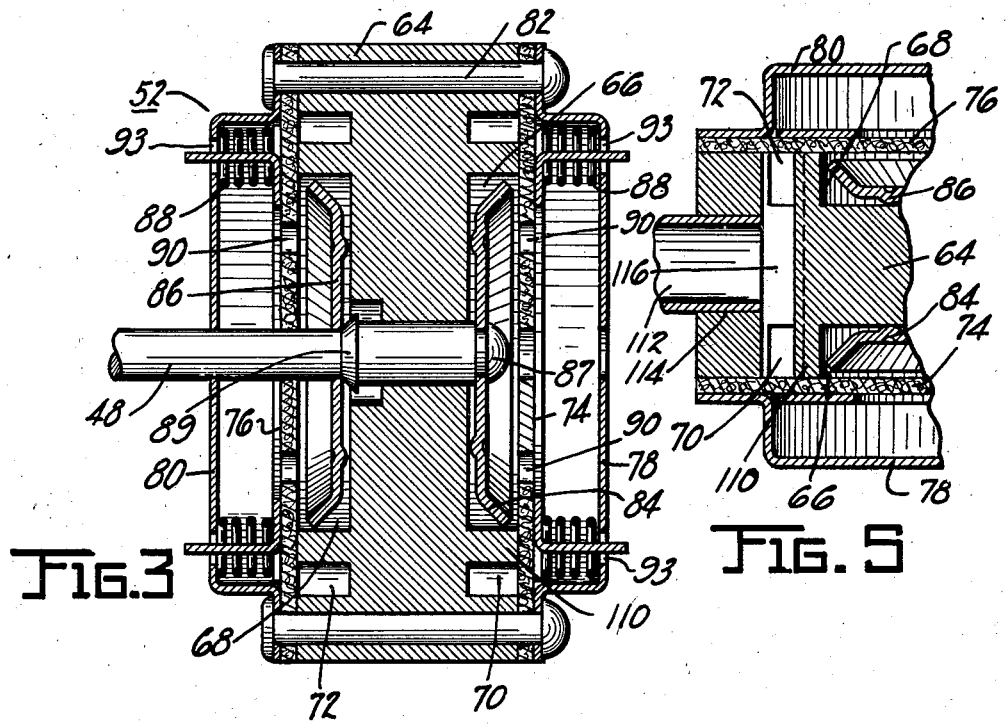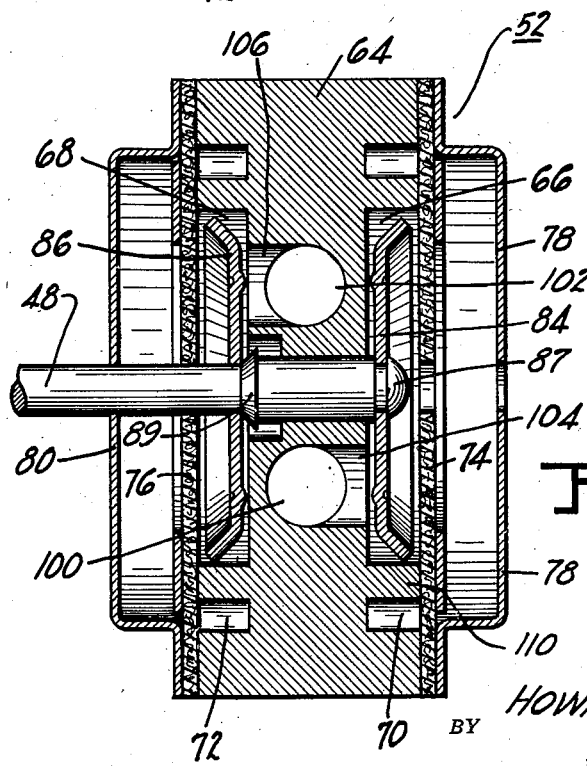

Oct. 6, 1942. H. E. HRUSKA 2,298,012
TRANSMISSION OPERATING MEANS
Filed June 17, 1939 4 Sheets-Sheet 3

INVENTOR.
HOWARD E. HRUSKA
BY
ATTORNEY.

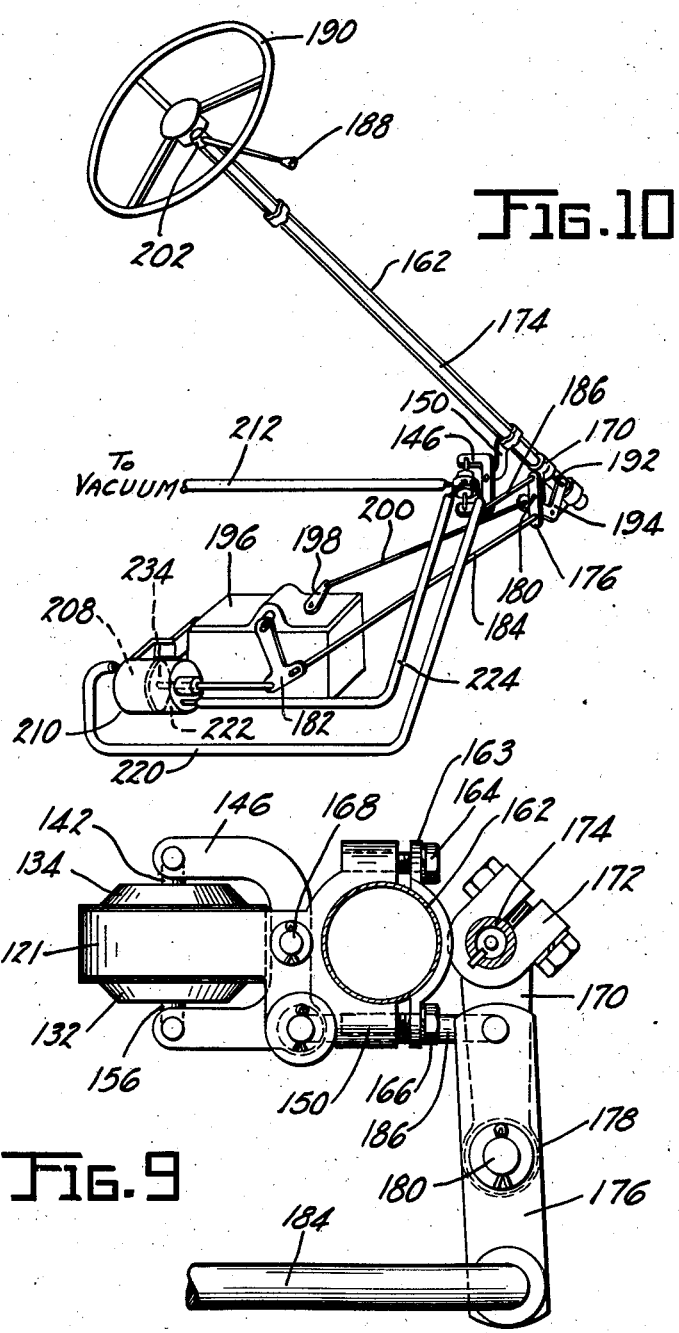

Patented Oct. 6, 1942

2,298,012

UNITED STATES PATENT OFFICE 2,298,012

TRANSMISSION OPERATING MEANS

Howard E. Hruska, South Bend, Ind., assignor to Bendix Aviation Corporation, South Bend, Ind., a corporation of Delaware Application June 17, 1939, Serial No. 279,670

2 Claims. (Cl. 74—335)

This invention relates to motor vehicles and more particularly to power means for operating the change-speed transmissions thereof.

There have been proposed various substitutes for the transmission, the transmission gear shifting lever, various positions for the shifting lever, and other modifications of the present generally used system, all designed for the purpose of simplifying the operations required of the driver. Some of these proposals are automatic, or semi-automatic, in their action, but most of them are more complicated to design, to manufacture and to service than is the construction now in general use, and they are, for these reasons, objectionable. On the other hand, there are definite objections to the construction now in general use and there is definite need for improvement, if such improvement may be accomplished without running into the complications which form so powerful an obstacle to the prior proposals.

One of the objections to the present system is the length of movement required of the gear shift lever or, if the movement is small, the relatively large force required to move said lever.

It is therefore one of the objects of the present invention to provide a transmission gear control mechanism so constituted as to avoid the above-referred-to difficulties.

A further object is to provide, in a manually controlled power operated gear shifting mechanism, a novel control apparatus therefor including an arrangement insuring that the extent of movement of the gear shifting member will be substantially proportional to the extent of movement of the control member, whereby an exceedingly accurate control may be exercised by the operator over the shifting of the gears. Such a mechanism is known in the art as a follow-up control, and in the preferred embodiment of my invention there is disclosed a so-called pressure sensitive type of follow-up valve for controlling a pressure differential operated motor operable to establish the transmission in any one of its four settings.

A still further object is to provide a fluid pressure operated power gear shifting mechanism having a relatively small manually operable control member, which may be mounted on the steering post beneath the steering wheel, and means controlled thereby in such a manner that the movements of such control member to effect a shifting of the transmission gears will be resisted by a force proportional to the force exerted by the transmission operating power means, whereby a so-called "feel" or reaction to shifting will be experienced by the operator in a manner simulating the reaction encountered in manually shifting transmission gears in the conventional manner.

One of the principal objects of the invention is to provide a double-acting pressure differential operated motor operably connected to the shift rail operating mechanism within the transmission, said motor being controlled by a valve located remote from the motor, the linkage interconnecting the motor, valve, transmission operating mechanism and selector means for controlling the operation of the valve being constructed and arranged to effect the aforementioned follow-up and feel operations of the mechanism.

Yet another object of the invention is to provide, in a transmission operating power mechanism, a floating lever connected to a pressure differential operated motor and also connected to a motor controlling valve, the fulcrum of said lever changing during the operation of said mechanism to effect first an opening of the valve and then either a closing of the valve or a lapping action thereof.

Another object of the invention is to provide, in a power means for operating the transmission, a linkage constructed to make possible an operation of the transmission solely by the physical effort of the driver, should the power means fail, or to make possible an operation of the transmission by the effort of the driver coupled with the force exerted by the power means.

Other objects of the invention and desirable details of construction and combinations of parts will become apparent from the following detailed description of certain embodiments of the invention, taken in conjunction with the accompanying drawings illustrating said embodiments, in which:

Figure 1 is a diagrammatic view disclosing the principal elements of the transmission operating mechanism constituting the preferred embodiment of my invention;

Figure 2 is a top plan view of the valve for controlling the transmission operating motor;

Figure 8:
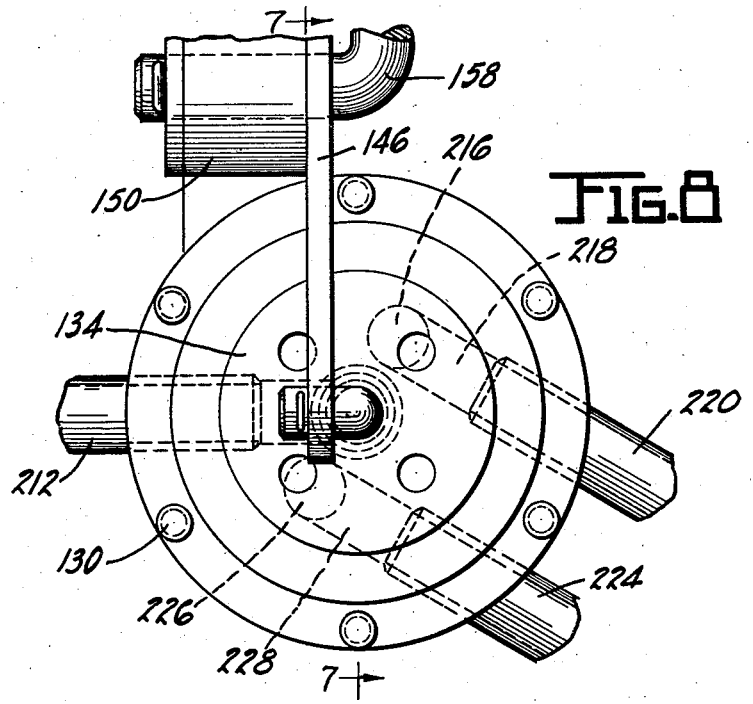
Figure 7:
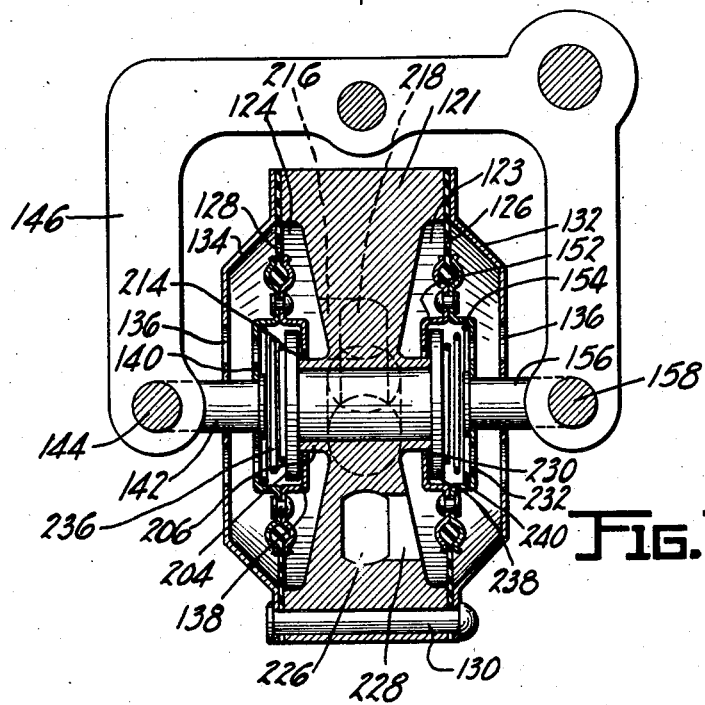

Figures 3 and 4 are sectional views, taken on the lines 3—3 and 4—4 respectively of Figure 2, disclosing details of the double-acting reactionary control valve of my invention;

Figure 5 is a fragmentary sectional view of the control valve, taken on the line 5—5 of Figure 2;

Figure 6 is a view, partly in section, disclosing in detail the manually operated selector located beneath the steering wheel;

Figure 7 is a sectional view, taken on the line 7—7 of Figure 8, disclosing another embodiment of double-acting pressure sensitive reactionary valve;

Figure 8 discloses a top plan view of the valve disclosed in Figure 7;

Figure 9 discloses the mounting for the valve of Figures 7 and 8 and a portion of the linkage for operating the valve; and Figure 10 is a diagrammatic view, similar to Figure 1, disclosing the valve and linkage of Figures 7, 8 and 9 incorporated in a transmission operating mechanism.

There are disclosed in Figure 1 the principal elements of the transmission operating mechanism constituting the preferred embodiment of my invention. The numeral 10 indicates a standard transmission provided with the usual shift rails, a crank 12 serving to actuate mechanism for selecting one or the other of the rails to be actuated and a three-armed crank 14 serving to actuate mechanism for moving the selected rail to establish the transmission in the desired gear ratio. This transmission, including the shift rails, the rail selecting mechanism and the rail operating mechanism, is not disclosed in detail, inasmuch as it constitutes a part of practically all automotive vehicles now being manufactured.

Describing now the transmission operating mechanism constituting my invention, when the driver desires to select the low and reverse gear rail, he, of course, first disengages the clutch. He then lifts up a selector lever 18, that is, moves it a slight distance counterclockwise in a plane perpendicular to the plane of the steering wheel 20. Such movement results in the downward movement of a rod 22 slidable within a tube 24 secured to the steering column 26 by brackets 28 and 30. As disclosed in Figure 6, the lever 18, which is located immediately beneath the steering wheel is pivotally connected to a pin 32 mounted in a casing 34, one end of the lever being connected to the upper end of the rod 22. The crank 12, which actuates the rail selecting mechanism, is connected to the rod 22 by a link 36 and a bell crank 38, the latter being pivotally mounted upon a bracket 40 secured to the steering column. The lifting up of the selector lever 18 results in a clockwise rotation of the crank 38, thereby actuating the rail selecting mechanism and making possible the subsequent actuation of the low and reverse shift rail to place the transmission either in low or reverse gear.

It will be assumed that the vehicle is at rest, with the engine idling, and that the driver desires to place the transmission in low gear. After the above-described disengagement of the clutch and after the rail selecting operation has been completed, the selector 18 is rotated clockwise in a plane parallel or substantially parallel to the plane of the steering wheel, thereby rotating the tube 24. To the lower end of the tube there is secured a crank 42 pivotally connected at its end by a pin 44 to a bar 46, which functions as a floating lever member; that is, its fulcrum may change to thereby change the lever from a lever of the third class, when the valve is opened, to a lever of the first class, when the valve is being lapped. To one end of the bar 46 there is pivotally connected a link 48 and to the other end a link 50. Link 48 is connected at its other end to a double-acting reactionary or pressure sensitive follow-up to lap type of valve mechanism 52 secured to the steering column by a bracket 54, said valve being operable to control the operation of a double-acting pressure differential operated motor 56. Link 50 is pivotally connected to one arm of the crank 14, and to another arm of the crank there is pivotally connected the connecting rod 60 secured to the piston 62 of the motor 56, which is preferably air suspended. The motor 56 is secured to the casing of the transmission by a bracket 58.

Describing now the valve mechanism disclosed in detail in Figures 2 to 5, inclusive, a cylindrically-shaped body member 64, preferably a casting, is shaped to provide recesses 66 and 68 and annular grooves 70 and 72 encircling said recesses. Flexible diaphragms 74 and 76, which may be defined as pressure sensitive valve members, and cup-shaped cover plates 78 and 80 are secured, by fastenings 82, to the sides of the body member 64, and disk-like valve operating members 84 and 86 complete the valve mechanism. The member 84 is fixedly secured to the end of a pin 87 slidably mounted through the center of the body member 64, and the member 86 is slidably mounted upon the end of the link 48 adjacent a cone-shaped end flange 89, which abuts the end of the pin 87. Spring members 88, interposed between the plates 78 and 80 and the diaphragms 74 and 76, serve to normally maintain the diaphragms in contact with the side faces of the body member 64. The diaphragms and cover plates are provided with openings 90 and 93 respectively to vent compartments 92 and 94 of the air-suspended motor 56 to the atmosphere, when the parts of my transmission operating mechanism are in their transmission neutral positions disclosed in the figures of the drawings. Conduits 96 and 98 and ducts 100, 102, 104 and 106 in the body portion 64 of the valve complete the means for placing the compartments 92 and 94 of the motor in air transmitting connection with the recesses 66 and 68 of the valve.

Continuing the description of the operation of the mechanism to place the transmission in low gear, when the selector 18 is rotated in a clockwise direction, that is, toward the driver, the crank 42 is also rotated clockwise and the bar 46 is moved counterclockwise about its pivot 108, thereby placing the link 48 under compression and moving it to open the valve 52. The rail locking mechanism of the transmission, such as the usual detents and cooperating spring loaded pins, and the friction of the parts will serve to make this operation possible, that is, the bar 46 will fulcrum at 108 as the valve is being opened. The movement of the link 48 to the left as disclosed in Figure 1, which is to the right as disclosed in Figures 3 and 4, will result in the disk 84 contacting the diaphragm or valve member 74, cutting off the communication between the atmosphere and the compartment 92 of the motor. Continued movement of the link will move the diaphragm 74, against the resistance of springs 88, away from an annular valve seat 110, thereby interconnecting the compartment 92 with a source of vacuum, such, for example, as the intake manifold, not shown, of the vehicle. Describing this connection, a conduit 112, leading to the source of vacuum, is connected to a port 114 in the valve body member. As disclosed in Figures 2 and 5, this port communicates with a recess 116, which, in turn, communicates with the aforementioned annular grooves 70 and 72. Thus, when the disk 84 moves the diaphragm 74 outwardly, against the resistance of the springs 88, the diaphragm is unseated. The compartment 92 of the motor is then connected to the source of vacuum via conduit 112, port 114, recess 116, groove 70, recess 66, ducts 104 and 100, and conduit 96. In this operation, the springs 88 quickly go solid, thereby abruptly stopping the movement of the diaphragm after it is unseated. When the gaseous pressure within the recess 66 is below atmospheric, that is, when said recess is connected with the source of vacuum, the diaphragm 74 is subjected to a differential of pressures tending to move it to the left, Figure 4. This force, which is known in the art as "feel," must be overcome by the driver in order to maintain the valve open.

Upon being connected to the vacuum source, air within the motor compartment 92 is withdrawn, resulting in the piston 62 being subjected to a differential of pressures; for the motor compartment 94 is at the time vented to the atmosphere via conduit 98, ducts 102 and 106, recess 68 and ports 90 and 93 in the diaphragm 76 and plate 80 respectively. Accordingly, the piston 62 and its connected low and reverse shift rail immediately start moving toward their low gear positions.

The driver of the vehicle in all probability will continue the movement of the selector lever once started, which movement will maintain the valve open, that is, the disk 84 will remain in the position just described. Most of the transmissions of the day are equipped with a so-called synchronizer mechanism functioning to bring the driving and driven gears to the same speed before they may be meshed. As this mechanism is functioning, movement of the shift rail is momentarily stopped, and in the transmission operating mechanism of my invention the motor piston 62 and bar 46 also stop moving. However, air continues to be withdrawn from the recess 66 and motor compartment 92, resulting in a further decrease in gaseous pressure within said recess and compartment. Accordingly, as a result of the decrease in gaseous pressure within the recess 66, the force necessary to maintain the selector lever 18 in position progressively increases while the synchronizer is functioning. It may be noted that such reaction or feel is present at all times while the valve is open and is directly proportional to the force exerted by the piston 62 upon the crank 14, for it should be remembered that the gaseous pressure within the compartment 92 and recess 66 is the same at all times. It should also be noted that this so-called feel in the power operated transmission operating mechanism of my invention simulates the resistance to movement of a gear shift lever extending from the floorboard of the driver's compartment, as said lever is being actuated to place the manually operated transmission in gear. This type of transmission operating mechanism has been conventional equipment in practically all automotive vehicles manufactured until a recent date.

Should the driver desire to aid the motor 56 in effecting the low gear operation of the transmission, he may add his physical effort, for, after the valve springs 88 go solid, the pivot 118, Figure 1, become a fulcrum, and the bar 46 is then rotated or tends to rotate clockwise, under the action of both the motor and the physical effort of the driver.

It should also be noted that in the event of complete failure of the motor the shift rails may be operated solely by the physical effort of the driver.

Should the movement of the selector lever be momentarily stopped, when the piston 62 and its connected shift rail are in motion and before the synchronizer begins to function, the pivot 44 then becomes a fulcrum for the bar 46, which then functions as a lever of the first class. The bar is then rotated clockwise about the pivot 44, resulting in a lapping of the valve, that is, the reseating of the diaphragm valve member 74. All moving parts come to a standstill and the system is then in equilibrium. This operation is known in the art as a follow-up action of the valve, and by virtue of this operation the motor piston 62 is said to follow the movement of the manually operated selector lever 18.

A lapping action of the valve may possibly occur immediately after the synchronizer begins to function, for at that time the driver, who is probably then adding his physical effort to the motor, senses the additional effort necessary to move the selector, and, instead of increasing his physical effort involuntarily, so controls this effort as to permit the piston of the motor to move sufficiently to lap the valve. It is assumed of course that the brake mechanism of the synchronizer will yield sufficiently to permit this slight movement.

After the synchronizer has completed its operation, thus appreciably decreasing the resistance to movement of the selector, the movement of the selector, the bar 46, the piston 62, the shift rail and all connections is resumed, probably at a higher rate of speed, to complete the establishment of the transmission in low gear. In this resumed operation of the mechanism the valve, of course, may again be opened. The clutch is then engaged and the throttle opened.

After the vehicle has been sufficiently accelerated in low gear, and it is desired to place the transmission in second gear or high gear, the clutch is again disengaged and the selector is then rotated counterclockwise, resulting in a complete reversal of the direction of movement of the above-described parts of the mechanism. The drift-lock or detents of the transmission acting to hold the low and reverse shift rail in its low gear position will result in the pivot 108 again becoming a fixed fulcrum to make possible an opening of the valve. The bar 46 again acting as a lever of the third class will then rotate clockwise about the pivot 108 to open the valve by effecting a movement of the disk 86 to the left, Figure 3. It is believed unnecessary to describe in detail the remainder of the operation of the mechanism, for such operation will be obvious from an inspection of the figures of the drawings and from a reading of the foregoing description. As to the operation of the valve, the valve operating disk 86 functions to unseat and permit a seating of the valve member 76 in the same manner as the member 84 functions to operate the valve member 74.

When the selector 18 and piston 62 reach their central positions, that is, their transmission neutral positions, a spring 120, Figure 6, aided by a spring 122 acting on the crank 12, functions automatically to move the selector and crank to thereby so actuate the rail selecting mechanism of the transmission as to prepare the transmission either for a high gear or a second gear operation. In this operation, the selector 18 rotates clockwise in a plane perpendicular to the plane of the steering wheel. Again it will be obvious from the previously given detailed description of the mechanism that subsequent counterclockwise or clockwise rotation will result in establishing the transmission either in second or in high gear respectively. Reverse gear, of course, is established by lifting the selector lever and then rotating it counterclockwise.

There is disclosed in Figures 7, 8, 9 and 10 another embodiment of my invention including a double-acting pressure sensitive control valve which functions in the same manner as the valve disclosed in Figures 3, 4 and 5. This embodiment differs from that disclosed in the latter figures only in the valve for controlling the transmission operating motor and in a small portion of the linkage for operating the same.

Referring to Figure 7, the body or casing 121 of the valve is provided with recesses 123 and 124 in its side walls. Flexible diaphragms 126 and 128 serve as valve operating members, and these diaphragms are covered by cup-shaped plates 132 and 134 provided with vent ports 136. Both the diaphragms and the plates are secured to the valve body member 121 by fastenings 130. To the diaphragm 128 there are secured cup-shaped stampings 138 and 140, the stamping 140 being provided at its center with an opening to receive a pin 142, the bent end portion 144 of said pin passing through an opening in a yoke 146. This member is pivotally mounted upon a clamp member 150 extending from the valve body member 121. To the central portion of the diaphragm 126 there are secured cup-shaped stampings 152 and 154, the latter having an opening in its center to receive a pin 156 having an bent end portion 158 extending through an opening in one end of the yoke 146.

There are disclosed in detail in Figure 9 and diagrammatically in Figure 10 the mounting for the valve member and the linkage for operating the valve. As disclosed in Figure 9, the valve body member 121 is extended to provide the clamp member 150, which is secured to the steering column 162 by a clamp member 163 and by bolts 164 and 166. A pin 168, extending through an opening in the yoke 146 and the clamp member 150, provides a pivotal mounting for the yoke. The yoke is rocked to operate the valve by linkage including a crank 170 secured by a split boss 172 to a tube 174, the latter being a duplicate of the tube 24, disclosed in Figure 1. A floating lever 176 is pivotally mounted at 178 to a pin 180 extending from the end of the crank 170, and this lever is connected to a transmission operating crank 182 by a link 184 and to the yoke 146 by a link 186. The links 184 and 186 are connected to the upper and lower ends respectively of the floating lever 176, and it will be apparent that this valve operating linkage functions in the same manner as the valve operating linkage of the mechanism disclosed in Figure 1.

The operation of the transmission operating mechanism disclosed in Figures 7–10 inclusive, and particularly the double-acting pressure sensensitive valve, will now be described in detail. Incidentally, this description of the operation of the mechanism will complete the description of the construction.

The clutch is disengaged and a selector 188, Figure 10, is then rotated counterclockwise in a plane perpendicular to the plane of the steering wheel 190. This movement of the selector serves to move a rod 192 downwardly to rotate a crank 194 clockwise to effect a selection of the low and reverse shift rail of the change-speed transmission 196. A crank 198, connected to the shift rail selecting mechanism of the transmission, is connected to the crank 194 by a link 200. The rod 192 is connected to the selector 188 by a connection 202, duplicating the connection disclosed in Figure 6. In brief, the mechanism just described is a duplicate of the mechanism for operating the crank 12 disclosed in Figure 1.

The selector 188 is then rotated clockwise to place the transmission in low gear. By this operation the link 186 is placed in compression and the yoke 146 is rocked in a clockwise direction, the pin 142 moving the plates 138 and 140 to the left, Figure 7. The plate 138 is moved into contact with a valve member 204 and moves the same off its seat, that is, the end face of a tubular central portion 206 of the valve body member 121. The diaphragm 128 and the stampings 138 and 140 constitute a valve operating member A compartment 208 of a double-ended motor 210 is thus connected with the source of vacuum via a conduit 212, the duct provided by the tubular central portion 206, a central opening 214 in the cup-shaped stamping 138, recess 124, ducts 216 and 218 in the body portion 121 and a conduit 220. Air is thus withdrawn from the compartment 208, and at the same time a compartment 222 of the motor 210 is vented to the atmosphere via a conduit 224, ducts 226 and 228 in the body member 121, recess 123, opening 230 in the stamping 152, openings 232 in the stamping 154 and the openings 136 in the cover plate 132. The piston or power element 234 of the motor is thus subjected to a differential of pressures, resulting in its movement to the left, Figure 10, to rotate the crank 182 and move the low and reverse shift rail to place the transmission in low gear.

Should the movement of the selector 188 be stopped before it reaches its low gear position, the piston will continue moving, and, as previously described, the lever 176 will fulcrum at 178 and rotate clockwise. This movement reverses the direction of rotation of the yoke 146 to lap the valve member 204, that is, to permit a valve spring 236 to reseat said member. When the valve is lapped, the connection between the source of vacuum and the compartment 208 is momentarily cut off, and the motor piston 234 comes to a stop. The system is then in equilibrium. This follow-up action of the valve makes possible a movement of the crank 182 corresponding to the movement of the selector, which, of course, simulates a manual operation of the transmission by means of a shift lever extending from the floorboard. It should also be noted that the mechanism disclosed in Figures 7–10 inclusive provides the so-called "feel," that is, a resistance to movement of the selector in direct proportion to the force exerted by the motor piston; for when the valve member 204 is unseated during the above-described operation of placing the transmission in low gear, the recess 124, or rather a compartment defined by said recess, the diaphragm 128 and stamping 138, is partially evacuated to the same degree as the motor compartment 208. Accordingly, the diaphragm 128, stamping 138 and valve are subjected to a differential of pressures tending to rotate the yoke 146 counterclockwise; for the outer face of these members is subject to atmospheric pressure, the air being admitted via openings 136.

Low gear having been established, the clutch is engaged and the throttle is opened to accelerate the vehicle to the desired speed. If the driver then desires to place the transmission in second gear, the clutch is again disengaged and the selector is rotated counterclockwise. This places the link 186 in tension, the lever-bar 176 rotating clockwise. The movement of the link 186 effects a counterclockwise rotation of the yoke 146. The stamping 152 contacts a valve member 238 and moves it off its seat. The compartment 222 of the motor is then connected to the source of vacuum, resulting in the piston 234 moving to the right to rotate the crank 182 counterclockwise to place the transmission in second gear. This piston movement takes place inasmuch as the compartment 208 of the motor is at the time vented to the atmosphere, resulting in a differential of pressures acting upon the piston. It will be obvious from an inspection of the drawings and from a consideration of the foregoing description that both the follow-up and feel operations of the mechanism will be effected in placing the transmission in second gear. Accordingly, it is believed unnecessary to again describe these functions in detail. It may be added that if either the valve spring 236 or a valve spring 240 goes solid the valve unit becomes a stop. Accordingly, should the power means fail, the crank 182 may be rotated solely by the physical effort of the driver; and as with the mechanism of Figures 1-6 inclusive, if the valve becomes a stop, the driver may add his physical effort to the then operating motor to place the transmission in gear.

There is thus provided a very simple and compact shift rail selecting and operating mechanism, the operation of the selector 18 or the selector 188 closely simulating the operation of a manually operated transmission including a shift lever extending from the floorboard of the driver's compartment.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a transmission having shift rails, means for moving one or another of said rails to establish the transmission in gear including a pressure differential operated motor, a manually operated selector, a valve mechanism for controlling the operation of said motor including a plurality of pressure sensitive valve members for controlling the flow of power fluid to and from the motor by the seating and unseating of said members, said mechanism being constructed so that one or the other of the valve members, after being moved to open the valve, is subjected to a force resulting from a differential of pressures to which the valve member is then subjected, said force resisting the maintenance of the valve member in its valve open position, and linkage interconnecting the selector, power element of the motor, the valve members and the transmission, said linkage including a floating lever member, and further including a link interconnecting the valve members and lever, said linkage being so constructed and arranged that when the selector is operated to open the valve said link is moved in one direction, and subsequent to this operation the aforementioned resisting action of the then acting valve member tends to move said link in the opposite direction.

2. In an automotive vehicle the combination with a steering column and a transmission having a member shiftable to provide different gear ratios, means for operating the transmission including a double-acting pressure differential operated motor, a double-acting valve mechanism located remotely from the motor for controlling the operation thereof, said valve mechanism being secured to the steering column by a bracket, a manually operated selector member mounted adjacent the upper end of the steering column, and force transmitting means interconnecting said selector, valve mechanism and the power element of the transmission operating motor, said force transmitting means including a floating lever member, a link interconnecting one end of said member with the valve mechanism and means interconnecting the center of the lever with the selector.

HOWARD E. HRUSKA.